(12) United States Patent
Tada (10) Patent No.: US 11,411,585 B2
(45) Date of Patent: Aug. 9, 2022

(54) RADIO-FREQUENCY MODULE AND COMMUNICATION DEVICE

(71) Applicant: Murata Manufacturing Co., Ltd., Nagaokakyo (JP)

(72) Inventor: Masaki Tada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/213,215

(22) Filed: Mar. 26, 2021

(65) Prior Publication Data

US 2021/0376867 A1    Dec. 2, 2021

(30) Foreign Application Priority Data

May 26, 2020  (JP) .............................. JP2020-091568

(51) Int. Cl.
*H04B 1/00* (2006.01)
*H04B 1/04* (2006.01)

(52) U.S. Cl.
CPC ........... *H04B 1/0078* (2013.01); *H04B 1/006* (2013.01); *H04B 1/0475* (2013.01); *H04B 1/0057* (2013.01); *H04B 1/0458* (2013.01); *H04B 2001/0408* (2013.01)

(58) Field of Classification Search
CPC .... H04B 1/005; H04B 1/0053; H04B 1/0057; H04B 1/006; H04B 1/0067; H04B 1/0075; H04B 1/0078; H04B 1/04; H04B 1/0458; H04B 1/0475; H04B 1/0483; H04B 1/44; H04B 1/48; H04B 2001/0408; H04B 2001/0416; H04B 7/0602

USPC ....... 375/219, 220, 222, 259, 260, 262, 265, 375/267, 297, 318; 370/277, 278, 281,
(Continued)

(56) References Cited

U.S. PATENT DOCUMENTS

| 5,524,283 | A | * | 6/1996 | Miyakawa | ............... | H04B 1/38 |
| | | | | | | 361/752 |
| 2013/0222045 | A1 | * | 8/2013 | Wu | ..................... | H01L 23/3675 |
| | | | | | | 257/E29.345 |
| 2019/0115946 | A1 | * | 4/2019 | Pehlke | .................... | H04B 1/04 |

(Continued)

FOREIGN PATENT DOCUMENTS

| JP | 2018-137522 A | 8/2018 |
| JP | 2019-176452 A | 10/2019 |

(Continued)

OTHER PUBLICATIONS

Office Action dated Mar. 21, 2022 in Korean Patent Application No. 10-2021-0033115, 9 pages.

*Primary Examiner* — Young T. Tse
(74) *Attorney, Agent, or Firm* — Xsensus LLP (57) ABSTRACT

A radio-frequency module includes a module substrate having a first principal surface and a second principal surface on opposite sides of the module substrate, a power amplifier capable of amplifying a transmission signal, a low-noise amplifier capable of amplifying a reception signal, a first switch connected to an input terminal of the power amplifier and disposed on the second principal surface, a second switch connected to an output terminal of the low-noise amplifier and disposed on the second principal surface, and a first ground terminal disposed in a region that is on the second principal surface and that is between the first switch and the second switch in plan view of the module substrate.

20 Claims, 4 Drawing Sheets

(58) Field of Classification Search
USPC .......... 370/282, 295; 455/78, 80, 82–84, 88, 455/114.3
See application file for complete search history.

(56) References Cited

U.S. PATENT DOCUMENTS

| | | | |
|---|---|---|---|
| 2019/0140669 A1* | 5/2019 | Aikawa | H04B 1/16 |
| 2019/0158137 A1* | 5/2019 | Brunel | H04B 1/005 |
| 2020/0186400 A1* | 6/2020 | Lee | H04B 1/525 |
| 2021/0306015 A1* | 9/2021 | Tada | H04B 1/0458 |

FOREIGN PATENT DOCUMENTS

| | | |
|---|---|---|
| KR | 10-2015-0142280 A | 12/2015 |
| WO | 2018/168500 A1 | 9/2018 |

\* cited by examiner

RADIO-FREQUENCY MODULE AND COMMUNICATION DEVICE

CROSS-REFERENCE TO RELATED APPLICATION

The present application is based on and claims priority of Japanese Patent Application No. 2020-091568 filed on May 26, 2020. The entire disclosure of the above-identified application, including the specification, drawings and claims is incorporated herein by reference in its entirety.

BACKGROUND

1. Field of the Disclosure

The present disclosure relates to a radio-frequency (RF) module and a communication device.

2. Description of the Related Art

Mobile communication devices, such as mobile phones, include a power amplifier that amplifies RF transmission signals. Japanese Unexamined Patent Application Publication No. 2018-137522 discloses a front-end circuit (RF module) including a power amplifier (PA) circuit (transmission amplifier circuit) that transmits a transmission signal and a low-noise amplifier (LNA) circuit (reception amplifier circuit) that transmits a reception signal. The transmission amplifier circuit includes a PA control unit that controls an amplification characteristic of a power amplifier, whereas the reception amplifier circuit includes an LNA control unit that controls an amplification characteristic of a low-noise amplifier.

SUMMARY

In the RF module disclosed in Japanese Unexamined Patent Application Publication No. 2018-137522, the transmission amplifier circuit and the reception amplifier circuit may electromagnetically couple to each other, and isolation between transmission and reception may degrade. In this case, for example, a harmonic of a high-power transmission signal transmitted in the transmission amplifier circuit or intermodulation distortion between the transmission signal and another RF signal may flow into the reception amplifier circuit through the electromagnetic coupling, and the reception sensitivity of the reception amplifier circuit may degrade.

Accordingly, one of the objects of the present disclosure is to provide a radio-frequency module and a communication device in which degradation of isolation between transmission and reception is suppressed.

According to embodiments of the present disclosure, a radio-frequency module includes a module substrate having a first principal surface and a second principal surface that are on opposite sides of the module substrate, a power amplifier capable of amplifying a transmission signal, a low-noise amplifier capable of amplifying a reception signal, a first switch connected to an input terminal of the power amplifier and disposed on the second principal surface, a second switch connected to an output terminal of the low-noise amplifier and disposed on the second principal surface, and a first ground terminal disposed in a region that is on the second principal surface and that is between the first switch and the second switch in plan view of the module substrate.

According to embodiments of the present disclosure, a radio-frequency module includes a module substrate having a first principal surface and a second principal surface that are on opposite sides of the module substrate, a power amplifier capable of amplifying a transmission signal, a low-noise amplifier capable of amplifying a reception signal, a first switch connected to an input terminal of the power amplifier and disposed on the second principal surface, a second switch connected to an output terminal of the low-noise amplifier and disposed on the second principal surface, and a first conductive component disposed in a region that is on the second principal surface and that is between the first switch and the second switch in plan view of the module substrate.

According to the embodiments of the present disclosure, it is possible to provide a radio-frequency module and a communication device in which degradation of isolation between transmission and reception is suppressed.

Other features, elements, characteristics and advantages of the present disclosure will become more apparent from the following detailed description of embodiments of the present disclosure with reference to the attached drawings.

DETAILED DESCRIPTION

Hereinafter, an embodiment of the present disclosure will be described in detail. The embodiment described below illustrates a general or specific example. The numerical values, shapes, materials, elements, the disposition and connection manner of the elements, and so forth described in the following embodiment are merely examples and are not intended to limit the present disclosure. Elements not described in the independent claims among the elements in the following example and modification example will be described as optional elements. The sizes of the elements illustrated in the drawings or the ratios between the sizes are not necessarily exact. In the drawings, elements that are substantially the same are denoted by the same reference numerals, and duplicate description may be omitted or simplified.

In the following description, terminology representing the relationship between elements, such as parallel and vertical, terminology representing the shape of an element, such as rectangular, and the range of a numerical value mean not only an exact relationship, an exact shape, and an exact range, respectively, but also a substantially equivalent relationship, a substantially equivalent shape, and a substantially equivalent range, respectively, and a difference of about several %, for example, is included.

In the following description, regarding A, B, and C mounted on a substrate, "C is disposed between A and B in plan view of the substrate (or a principal surface of the substrate)" means that at least one of a plurality of line segments connecting certain points in A and certain points in B passes through the region of C in plan view of the substrate. "In plan view of the substrate" means that the substrate and circuit elements mounted on the substrate are viewed in orthogonal projection on a plane parallel to the principal surface of the substrate.

In the following description, a "transmission path" means a transmission line constituted by a wiring line through which a radio-frequency transmission signal propagates, an electrode directly connected to the wiring line, a terminal directly connected to the wiring line or the electrode, and so forth. A "reception path" means a transmission line constituted by a wiring line through which a radio-frequency reception signal propagates, an electrode directly connected to the wiring line, a terminal directly connected to the wiring line or the electrode, and so forth. A "transmission/reception path" means a transmission line constituted by a wiring line through which a radio-frequency transmission signal and a radio-frequency reception signal propagate, an electrode directly connected to the wiring line, a terminal directly connected to the wiring line or the electrode, and so forth.

Embodiment

1. Circuit Configuration of Radio-Frequency Module 1 and Communication Device 5

Figure 1:
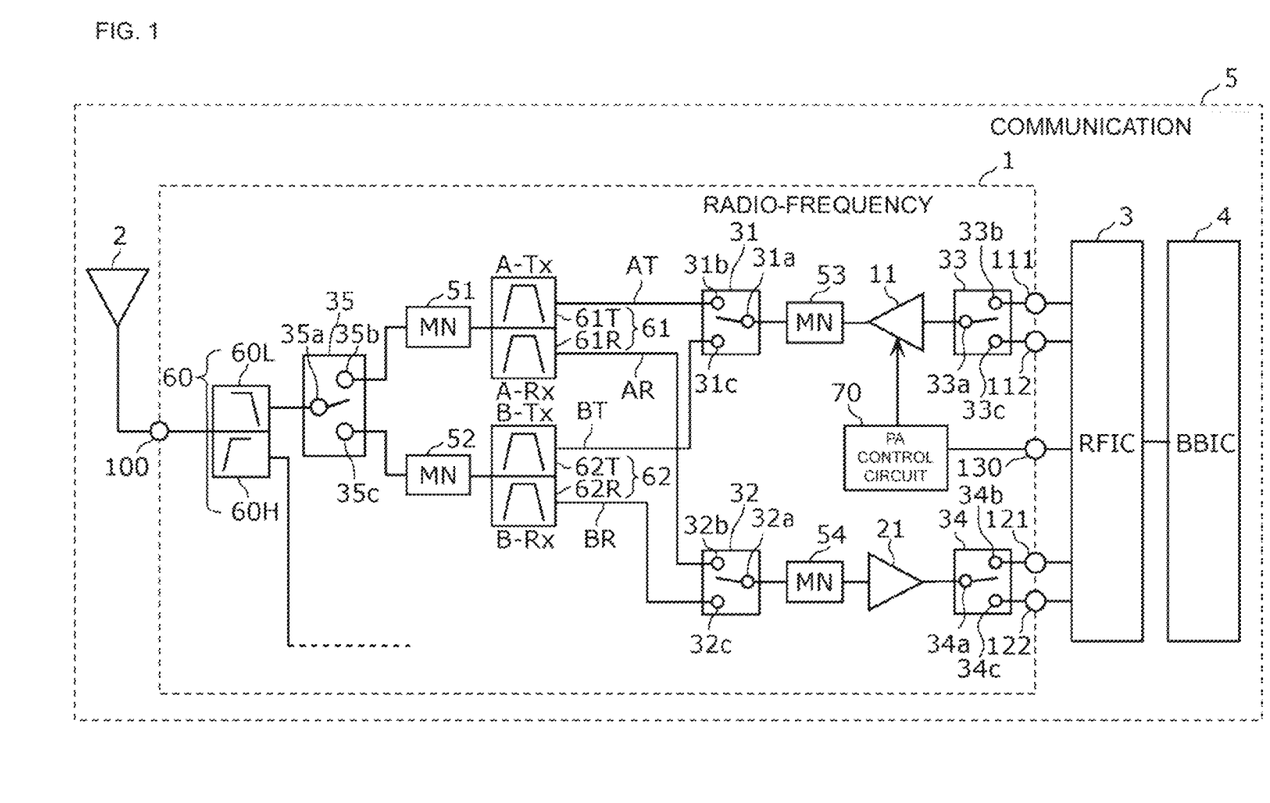
FIG. 1 is a circuit configuration diagram of a radio-frequency module and a communication device according to an embodiment.

FIG. 1 is a circuit configuration diagram of a radio-frequency (RF) module 1 and a communication device 5 according to an embodiment. As illustrated in FIG. 1, the communication device 5 includes the RF module 1, an antenna 2, an RF signal processing circuit (RF integrated circuit (RFIC)) 3, and a baseband signal processing circuit (baseband integrated circuit (BBIC)) 4.

The RFIC 3 is an RF signal processing circuit that processes an RF signal that is to be transmitted by the antenna 2 or that has been received by the antenna 2. Specifically, the RFIC 3 performs signal processing, such as down-conversion, on a reception signal received through a reception path of the RF module 1, and outputs the reception signal subjected to the signal processing to the BBIC 4. In addition, the RFIC 3 performs signal processing, such as up-conversion, on a transmission signal received from the BBIC 4, and outputs the transmission signal subjected to the signal processing to a transmission path of the RF module 1.

The BBIC 4 is a circuit that performs signal processing by using an intermediate frequency band lower than the frequency of an RF signal transmitted in the RF module 1. A signal processed by the BBIC 4 is used as, for example, an image signal for displaying an image or an audio signal for a call performed via a speaker.

The RFIC 3 also functions as a control unit that controls, on the basis of a communication band (frequency band) that is used, connections of switches 31, 32, 33, 34, and 35 included in the RF module 1. Specifically, the RFIC 3 switches connections of the switches 31 to 35 included in the RF module 1 by using control signals (not illustrated). Specifically, the RFIC 3 outputs digital control signals for controlling the switches 31 to 35 to a power amplifier (PA) control circuit 70. In response to the digital control signals received from the RFIC 3, the PA control circuit 70 of the RF module 1 outputs digital control signals to the switches 31 to 35, thereby controlling the connections and non-connections of the switches 31 to 35.

The RFIC 3 also functions as a control unit that controls the gain of a power amplifier 11 included in the RF module 1, and a power supply voltage Vcc and a bias voltage Vbias that are to be supplied to the power amplifier 11. Specifically, the RFIC 3 outputs digital control signals of Mobile Industry Processor Interface (MIPI), General-Purpose Input/Output (GPIO), and the like, to a control signal terminal 130 of the RF module 1. The PA control circuit 70 of the RF module 1 outputs a control signal, the power supply voltage Vcc, or the bias voltage Vbias to the power amplifier 11 in response to a digital control signal received via the control signal terminal 130, thereby adjusting the gain of the power amplifier 11. Alternatively, a control signal terminal that receives from the RFIC 3 a digital control signal for controlling the gain of the power amplifier 11, and a control signal terminal that receives from the RFIC 3 a digital control signal for controlling the power supply voltage Vcc and the bias voltage Vbias that are to be supplied to the power amplifier 11, may be different from each other. Alternatively, the control unit may be disposed outside the RFIC 3, for example, in the BBIC 4.

The antenna 2 is connected to an antenna connection terminal 100 of the RF module 1, radiates an RF signal output from the RF module 1, and receives an RF signal from the outside and outputs the RF signal to the RF module 1.

In the communication device 5 according to the present embodiment, the antenna 2 and the BBIC 4 are not essential elements.

Next, a detailed configuration of the RF module 1 will be described.

As illustrated in FIG. 1, the RF module 1 includes the antenna connection terminal 100, the power amplifier 11, a low-noise amplifier 21, transmission filters 61T and 62T, reception filters 61R and 62R, the PA control circuit 70, matching circuits 51, 52, 53, and 54, the switches 31, 32, 33, 34, and 35, and a diplexer 60.

The antenna connection terminal 100 is connected to the antenna 2.

The power amplifier 11 is an amplifier circuit capable of amplifying transmission signals of a communication band A and a communication band B received from transmission input terminals 111 and 112. Alternatively, the RF module 1 may include, instead of the power amplifier 11, a first power amplifier that amplifies an RF signal of the communication band A and a second power amplifier that amplifies an RF signal of the communication band B.

The PA control circuit 70 adjusts the gain of an amplifying element included in the power amplifier 11 by using digital control signals MIPI, GPIO, and the like received via the control signal terminal 130. The PA control circuit 70 may be formed of a semiconductor integrated circuit (IC). The semiconductor IC is composed of, for example, complementary metal oxide semiconductor (CMOS). Specifically, the semiconductor IC is formed by a silicon on insulator (SOI) process. Accordingly, the semiconductor IC can be manufactured at low cost. Alternatively, the semiconductor IC may be composed of at least any one of GaAs, SiGe, and GaN. This makes it possible to output an RF signal having high-quality amplification performance and noise performance.

The low-noise amplifier 21 is an amplifier that is capable of amplifying RF signals of the communication bands A and B with low noise and that outputs the RF signals to reception output terminals 121 and 122. The RF module 1 may include a plurality of low-noise amplifiers. For example, the RF module 1 may include a first low-noise amplifier that amplifies an RF signal of the communication band A and a second low-noise amplifier that amplifies an RF signal of the communication band B.

The power amplifier 11 and the low-noise amplifier 21 are each constituted by a field-effect transistor (FET), a heterojunction bipolar transistor (HBT), or the like composed of, for example, Si-based CMOS or GaAs.

The transmission filter 61T is disposed on a transmission path AT that connects the transmission input terminals 111 and 112 and the antenna connection terminal 100, and allows a transmission signal of the transmission band of the communication band A among transmission signals amplified by the power amplifier 11 to pass therethrough. The transmission filter 62T is disposed on a transmission path BT that connects the transmission input terminals 111 and 112 and the antenna connection terminal 100, and allows a transmission signal of the transmission band of the communication band B among transmission signals amplified by the power amplifier 11 to pass therethrough.

The reception filter 61R is disposed on a reception path AR that connects the reception output terminals 121 and 122 and the antenna connection terminal 100, and allows a reception signal of the reception band of the communication band A among reception signals input from the antenna connection terminal 100 to pass therethrough. The reception filter 62R is disposed on a reception path BR that connects the reception output terminals 121 and 122 and the antenna connection terminal 100, and allows a reception signal of the reception band of the communication band B among reception signals input from the antenna connection terminal 100 to pass therethrough.

The transmission filter 61T and the reception filter 61R constitute a duplexer 61 whose pass band is the communication band A. The duplexer 61 transmits a transmission signal and a reception signal of the communication band A by using a frequency division duplex (FDD) scheme. The transmission filter 62T and the reception filter 62R constitute a duplexer 62 whose pass band is the communication band B. The duplexer 62 transmits a transmission signal and a reception signal of the communication band B by using the FDD scheme.

Alternatively, each of the duplexers 61 and 62 may be a multiplexer constituted by only a plurality of transmission filters, a multiplexer constituted by only a plurality of reception filters, or a multiplexer constituted by a plurality of duplexers. Alternatively, the transmission filter 61T and the reception filter 61R need not necessarily constitute the duplexer 61, and each of which may be a single filter that performs transmission by using a time division duplex (TDD) scheme. In this case, a switch that switches between transmission and reception is disposed in at least one of the preceding stage or the subsequent stage of the single filter. Likewise, the transmission filter 62T and the reception filter 62R need not necessarily constitute the duplexer 62, and each of which may be a single filter that performs transmission by using the TDD scheme.

The matching circuit 51 is disposed on a path that connects the switch 35 and the duplexer 61, and achieves impedance matching between the switch 35 and the duplexer 61 and between the antenna 2 and the duplexer 61. The matching circuit 52 is disposed on a path that connects the switch 35 and the duplexer 62, and achieves impedance matching between the switch 35 and the duplexer 62 and between the antenna 2 and the duplexer 62. The matching circuit 53 is disposed on a transmission path that connects the power amplifier 11 and the switch 31, and achieves impedance matching between the power amplifier 11 and the switch 31 and between the power amplifier 11 and the duplexers 61 and 62. The matching circuit 54 is disposed on a reception path that connects the low-noise amplifier 21 and the switch 32, and achieves impedance matching between the low-noise amplifier 21 and the switch 32 and between the low-noise amplifier 21 and the duplexers 61 and 62.

The switch 33 is an example of a first switch connected to an input terminal of the power amplifier 11 and includes a common terminal 33a and selection terminals 33b and 33c. The common terminal 33a is connected to the input terminal of the power amplifier 11, the selection terminal 33b is connected to the transmission input terminal 111, and the selection terminal 33c is connected to the transmission input terminal 112. With this connection configuration, the switch 33 switches between connection between the power amplifier 11 and the transmission input terminal 111 and connection between the power amplifier 11 and the transmission input terminal 112. The switch 33 is constituted by, for example, a single pole double throw (SPDT) switch circuit.

A transmission signal of the communication band A, for example, is input from the transmission input terminal 111, and a transmission signal of the communication band B, for example, is input from the transmission input terminal 112. Alternatively, a transmission signal of the communication band A or B in the fourth-generation mobile communication system (4G), for example, may be input from the transmission input terminal 111, and a transmission signal of the communication band A or B in the fifth-generation mobile communication system (5G), for example, may be input from the transmission input terminal 112.

Alternatively, the switch 33 may have a configuration in which a common terminal is connected to a transmission input terminal, one of selection terminals is connected to a first power amplifier that amplifies a transmission signal of the communication band A, and the other selection terminal is connected to a second power amplifier that amplifies a transmission signal of the communication band B. In this case, transmission signals of the communication bands A and B, for example, are input from the transmission input terminal. Alternatively, a transmission signal of the communication band A in 4G and a transmission signal of the communication band B in 5G, for example, may be input from the transmission input terminal.

Alternatively, the switch 33 may be constituted by a double pole double throw (DPDT) switch circuit including two common terminals and two selection terminals. In this case, the transmission input terminal 111 is connected to one of the common terminals, and the transmission input terminal 112 is connected to the other common terminal. Also, one of the selection terminals is connected to a first power amplifier that amplifies a transmission signal of the communication band A, and the other selection terminal is connected to a second power amplifier that amplifies a transmission signal of the communication band B. With this connection configuration, the switch 33 switches between connection between the one common terminal and the one selection terminal and connection between the one common terminal and the other selection terminal, and also switches between connection between the other common terminal and the one selection terminal and connection between the other common terminal and the other selection terminal. In this case, for example, a transmission signal of the communication band A is input from the transmission input terminal 111, and a transmission signal of the communication band B is input from the transmission input terminal 112. Alternatively, for example, transmission signals of the communication bands A and B in 4G may be input from the transmission input terminal 111, and transmission signals of the communication bands A and B in 5G may be input from the transmission input terminal 112.

The switch 34 is an example of a second switch connected to an output terminal of the low-noise amplifier 21 and includes a common terminal 34a and selection terminals 34b and 34c. The common terminal 34a is connected to the output terminal of the low-noise amplifier 21, the selection terminal 34b is connected to the reception output terminal 121, and the selection terminal 34c is connected to the reception output terminal 122. With this connection configuration, the switch 34 switches between connection between the low-noise amplifier 21 and the reception output terminal 121 and connection between the low-noise amplifier 21 and the reception output terminal 122. The switch 34 is constituted by, for example, an SPDT switch circuit.

A reception signal of the communication band A, for example, is output from the reception output terminal 121, and a reception signal of the communication band B, for example, is output from the reception output terminal 122. Alternatively, a reception signal of the communication band A or B in 4G, for example, may be output from the reception output terminal 121, and a reception signal of the communication band A or B in 5G, for example, may be output from the reception output terminal 122.

The switch 34 may have a configuration in which a common terminal is connected to a reception output terminal, one of selection terminals is connected to a first low-noise amplifier that amplifies a reception signal of the communication band A, and the other selection terminal is connected to a second low-noise amplifier that amplifies a reception signal of the communication band B. In this case, reception signals of the communication bands A and B, for example, are output from the reception output terminal. Alternatively, a reception signal of the communication band A in 4G and a reception signal of the communication band B in 5G, for example, may be output from the reception output terminal.

Alternatively, the switch 34 may be constituted by a DPDT switch circuit including two common terminals and two selection terminals. In this case, the reception output terminal 121 is connected to one of the common terminals, and the reception output terminal 122 is connected to the other common terminal. One of the selection terminals is connected to a first low-noise amplifier that amplifies a reception signal of the communication band A, and the other selection terminal is connected to a second low-noise amplifier that amplifies a reception signal of the communication band B. With this connection configuration, the switch 34 switches between connection between the one common terminal and the one selection terminal and connection between the one common terminal and the other selection terminal, and also switches between connection between the other common terminal and the one selection terminal and connection between the other common terminal and the other selection terminal. In this case, for example, a reception signal of the communication band A is output from the reception output terminal 121, and a reception signal of the communication band B is output from the reception output terminal 122. Alternatively, for example, reception signals of the communication bands A and B in 4G may be output from the reception output terminal 121, and reception signals of the communication bands A and B in 5G may be output from the reception output terminal 122.

The numbers of common terminals and selection terminals included in the switches 33 and 34 are appropriately set in accordance with the number of signal paths included in the RF module 1 and the number of output terminals of the RFIC 3.

The switch 31 is a third switch connected to an output terminal of the power amplifier 11 via the matching circuit 53 and includes a common terminal 31a and selection terminals 31b and 31c. The common terminal 31a is connected to the output terminal of the power amplifier 11 via the matching circuit 53. The selection terminal 31b is connected to the transmission filter 61T, and the selection terminal 31c is connected to the transmission filter 62T. With this connection configuration, the switch 31 switches between connection between the power amplifier 11 and the transmission filter 61T and connection between the power amplifier 11 and the transmission filter 62T. The switch 31 is constituted by, for example, an SPDT switch circuit.

The switch 32 is an example of a fourth switch and includes a common terminal 32a and selection terminals 32b and 32c. The common terminal 32a is connected to an input terminal of the low-noise amplifier 21 via the matching circuit 54. The selection terminal 32b is connected to the reception filter 61R, and the selection terminal 32c is connected to the reception filter 62R. With this connection configuration, the switch 32 switches between connection and non-connection between the low-noise amplifier 21 and the reception filter 61R and switches between connection and non-connection between the low-noise amplifier 21 and the reception filter 62R. The switch 32 is constituted by, for example, an SPDT switch circuit.

The switch 35 is an example of a fifth switch connected to the antenna connection terminal 100, is connected to the antenna connection terminal 100 via the diplexer 60, and switches between (1) connection between the antenna connection terminal 100 and the transmission path AT and between the antenna connection terminal 100 and the reception path AR and (2) connection between the antenna connection terminal 100 and the transmission path BT and between the antenna connection terminal 100 and the reception path BR. The switch 35 is constituted by a multi-connection switch circuit capable of simultaneously achieving the connections (1) and (2).

The diplexer 60 is an example of a multiplexer and is constituted by filters 60L and 60H. The filter 60L is a filter whose pass band is a frequency range including the communication bands A and B, and the filter 60H is a filter whose pass band is another frequency range different from the frequency range including the communication bands A and B. One terminal of the filter 60L and one terminal of the filter 60H are connected in common to the antenna connection terminal 100. Each of the filters 60L and 60H is, for example, an LC filter constituted by at least one of a chip-shaped inductor and capacitor. In a case where the frequency range including the communication bands A and B is on the lower frequency side than the other frequency range, the filter 60L may be a low pass filter, and the filter 60H may be a high pass filter.

Each of the above-described transmission filters 61T and 62T and reception filters 61R and 62R may be, for example, any one of an acoustic wave filter using a surface acoustic wave (SAW), an acoustic wave filter using a bulk acoustic wave (BAW), an LC resonance filter, and a dielectric filter, and is furthermore not limited thereto.

In addition, a matching circuit may be disposed between the power amplifier 11 and the switch 33 and between the low-noise amplifier 21 and the switch 34.

In the configuration of the RF module 1, the switch 33, the power amplifier 11, the matching circuit 53, the switch 31, the transmission filter 61T, the matching circuit 51, the switch 35, the filter 60L, and the transmission path AT constitute a first transmission circuit that transmits a transmission signal of the communication band A toward the antenna connection terminal 100. The filter 60L, the switch 35, the matching circuit 51, the reception filter 61R, the switch 32, the matching circuit 54, the low-noise amplifier 21, the switch 34, and the reception path AR constitute a first reception circuit that transmits a reception signal of the communication band A from the antenna 2 via the antenna connection terminal 100.

The switch 33, the power amplifier 11, the matching circuit 53, the switch 31, the transmission filter 62T, the matching circuit 52, the switch 35, the filter 60L, and the transmission path BT constitute a second transmission circuit that transmits a transmission signal of the communication band B toward the antenna connection terminal 100. The filter 60L, the switch 35, the matching circuit 52, the reception filter 62R, the switch 32, the matching circuit 54, the low-noise amplifier 21, the switch 34, and the reception path BR constitute a second reception circuit that transmits a reception signal of the communication band B from the antenna 2 via the antenna connection terminal 100.

With the above-described circuit configuration, the RF module 1 is capable of performing at least any one of transmission, reception, and transmission-and-reception of an RF signal of either the communication band A or the communication band B. Furthermore, the RF module 1 is capable of performing at least any one of simultaneous transmission, simultaneous reception, and simultaneous transmission-and-reception of RF signals of the communication band A and the communication band B.

In an RF module according to an embodiment of the present disclosure, the above-described two transmission circuits and the above-described two reception circuits need not necessarily be connected to the antenna connection terminal 100 via the switch 35, and may be connected to the antenna 2 via different terminals. It is sufficient that an RF module according to an embodiment of the present disclosure include, in the circuit illustrated in FIG. 1, the power amplifier 11, the low-noise amplifier 21, and the switches 33 and 34.

The low-noise amplifier 21 and at least one of the switches 31 to 35 may be included in a single semiconductor IC. The semiconductor IC is composed of, for example, CMOS.

Specifically, the semiconductor IC is formed by an SOI process. Accordingly, the semiconductor IC can be manufactured at low cost. Alternatively, the semiconductor IC may be composed of at least any one of GaAs, SiGe, and GaN. This makes it possible to output an RF signal having high-quality amplification performance and noise performance.

In the case of mounting the individual circuit elements constituting the RF module 1 on a single module substrate as a compact front-end circuit, the layout area of the circuit elements on a surface of the module substrate is to be reduced. In this case, it is assumed that the first and second transmission circuits electromagnetically couple to the first and second reception circuits. In this case, a harmonic of a high-power transmission signal transmitted through the transmission paths AT and BT or intermodulation distortion between the transmission signal and another RF signal flows into either the reception path AR or BR through the electromagnetic coupling, and the reception sensitivity of the reception path degrades.

To address this, the RF module 1 according to the present embodiment has a configuration of suppressing the electromagnetic coupling. Hereinafter, the configuration of suppressing the electromagnetic coupling in the RF module 1 according to the present embodiment will be described.

2. Layout of Circuit Elements of RF Module 1A According to Example

Figure 2A:
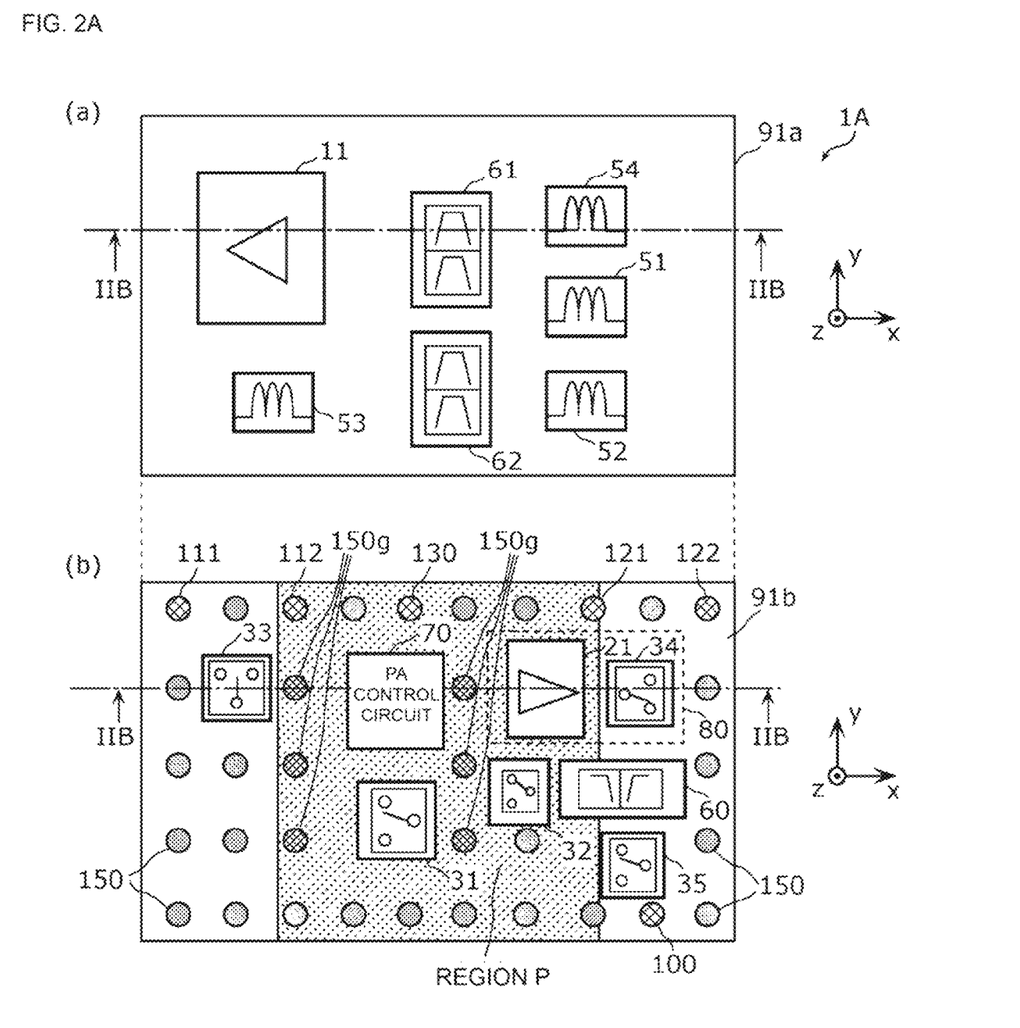
FIG. 2A is a schematic plan view of the configuration of a radio-frequency module according to an example.
Figure 2B:
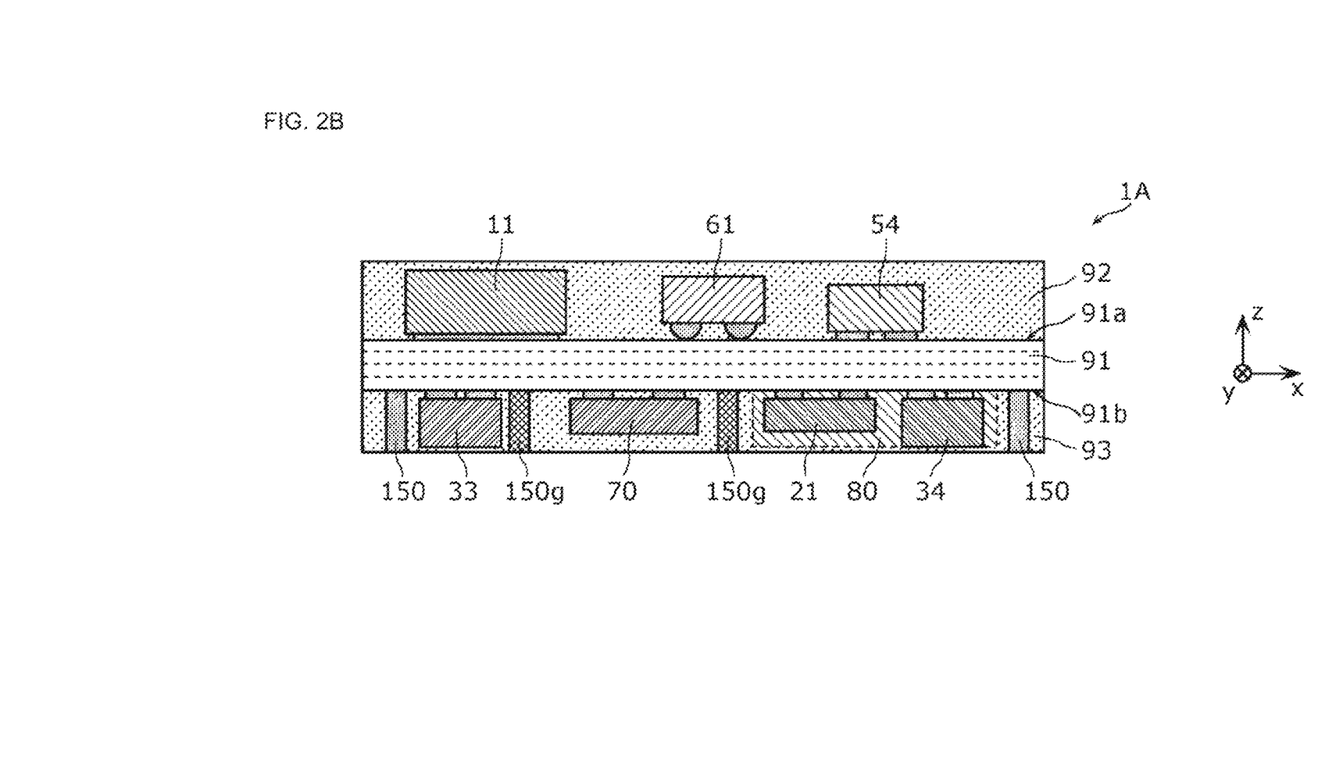
FIG. 2B is a schematic sectional view of the configuration of the radio-frequency module according to the example.

FIG. 2A is a schematic plan view of the configuration of an RF module 1A according to an example. FIG. 2B is a schematic sectional view of the configuration of the RF module 1A according to the example, and specifically is a sectional view taken along line IIB-IIB in FIG. 2A. Part (a) of FIG. 2A illustrates the layout of circuit elements when a principal surface 91a of principal surfaces 91a and 91b on opposite sides of a module substrate 91 is viewed from a z-axis positive direction. On the other hand, part (b) of FIG. 2A illustrates a perspective view of the layout of circuit elements when the principal surface 91b is viewed from the z-axis positive direction.

The RF module 1A according to the present example specifically illustrates the layout of the individual circuit elements constituting the RF module 1 according to the embodiment.

As illustrated in FIG. 2A and FIG. 2B, the RF module 1A according to the present example includes, in addition to the circuit configuration illustrated in FIG. 1, the module substrate 91, resin members 92 and 93, and external connection terminals 150.

The module substrate 91 is a substrate having the principal surface 91a (first principal surface) and the principal surface 91b (second principal surface) that are on opposite sides of the module substrate 91, and the above-described transmission circuits and reception circuits are mounted thereon. As the module substrate 91, for example, a low temperature co-fired ceramics (LTCC) substrate or high temperature co-fired ceramics (HTCC) substrate having a multilayer structure of a plurality of dielectric layers, a component built-in substrate, a substrate having a redistribution layer (RDL), a printed circuit board, or the like is used.

The resin member 92 is disposed on the principal surface 91a of the module substrate 91, covers part of the above-described transmission circuits, part of the above-described reception circuits, and the principal surface 91a of the module substrate 91, and has a function of ensuring reliability, such as mechanical strength and moisture resistance, of circuit elements constituting the above-described transmission circuits and reception circuits. The resin member 93 is disposed on the principal surface 91b of the module substrate 91, covers part of the above-described transmission circuits, part of the above-described reception circuits, and the principal surface 91b of the module substrate 91, and has a function of ensuring reliability, such as mechanical strength and moisture resistance, of circuit elements constituting the above-described transmission circuits and reception circuits. The resin members 92 and 93 are not essential elements of an RF module according to an embodiment of the present disclosure.

As illustrated in FIG. 2A and FIG. 2B, in the RF module 1A according to the present example, the power amplifier 11, the duplexers 61 and 62, and the matching circuits 51, 52, 53, and 54 are disposed on the principal surface 91a (first principal surface) of the module substrate 91. On the other hand, the PA control circuit 70, the low-noise amplifier 21, the switches 31, 32, 33, 34, and 35, and the diplexer 60 are disposed on the principal surface 91b (second principal surface) of the module substrate 91.

Although not illustrated in FIG. 2A, the wiring lines constituting the transmission paths AT and BT and the reception paths AR and BR illustrated in FIG. 1 are disposed in the module substrate 91 and on the principal surfaces 91a and 91b. The wiring lines may be bonding wires whose both ends are joined to the principal surfaces 91a and 91b and any one of the circuit elements constituting the RF module 1A, or may be terminals, electrodes, or wiring lines disposed on surfaces of the circuit elements constituting the RF module 1A.

In the RF module 1A according to the present example, the plurality of external connection terminals 150 are disposed on the principal surface 91b (second principal surface) of the module substrate 91. The RF module 1A transmits electric signals to and receives electric signals from an external substrate disposed in a z-axis negative direction of the RF module 1A via the plurality of external connection terminals 150. As illustrated in part (b) of FIG. 2A, the plurality of external connection terminals 150 include the antenna connection terminal 100, the transmission input terminals 111 and 112, the reception output terminals 121 and 122, and the control signal terminal 130. Some of the plurality of external connection terminals 150 are ground terminals 150g (each of which is a first ground terminal or a second ground terminal) that are set to the ground potential of the external substrate.

In the present example, as illustrated in part (b) of FIG. 2A, the switches 33 and 34 are disposed on the principal surface 91b. In plan view of the module substrate 91, the ground terminals 150g are disposed in a region P that is on the principal surface 91b and that is between the switches 33 and 34.

In the above-described configuration, the switches 33 and 34 are disposed so as to sandwich the ground terminals 150g on the principal surface 91b. The ground terminals 150g are thus capable of blocking electromagnetic fields generated by the switches 33 and 34 and are thus capable of suppressing the electromagnetic coupling between the switches 33 and 34. This makes it possible to suppress the occurrence of a situation in which a harmonic of a high-power transmission signal transmitted through the transmission paths AT and BT or intermodulation distortion between the transmission signal and another RF signal flows into either the reception path AR or BR through the electromagnetic coupling, causing degradation of the reception sensitivity of the reception path.

In the present embodiment, the region P that is on the principal surface 91b and that is between the switches 33 and 34 in plan view of the module substrate 91 is defined as a region that is on the principal surface 91b and that is between a straight line which is closest to and is not in contact with the switch 33 and a straight line which is closest to and is not in contact with the switch 34 among straight lines crossing at right angles a line segment connecting the switches 33 and 34 in plan view of the module substrate 91.

It is desired that the ground terminals 150g be disposed between the switches 33 and 34. This disposition makes it possible to effectively suppress the electromagnetic coupling between the switches 33 and 34.

In the present example, as illustrated in part (b) of FIG. 2A, the switches 33 and 34 are disposed on the principal surface 91b. In plan view of the module substrate 91, the switch 31 is disposed in the region P that is on the principal surface 91b and that is between the switches 33 and 34.

The switches 33 and 34 are disposed so as to sandwich the switch 31 on the principal surface 91b. The switch 31 is an example of a first conductive component and includes conductive members, such as an electrode and a terminal. Thus, the switch 31 is capable of blocking electromagnetic fields generated by the switches 33 and 34 and is thus capable of suppressing the electromagnetic coupling between the switches 33 and 34. This makes it possible to suppress the occurrence of a situation in which a harmonic of a high-power transmission signal transmitted through the transmission paths AT and BT or intermodulation distortion between the transmission signal and another RF signal flows into either the reception path AR or BR through the electromagnetic coupling, causing degradation of the reception sensitivity of the reception path.

The conductive component is an electronic component including a conductive member such as a signal extraction electrode, and is, for example, at least any one of a chip resistor, a chip capacitor, a chip inductor, a filter, a switch, and an active element such as an amplifier or a control circuit.

It is desired that the switch 31 be disposed between the switches 33 and 34. This disposition makes it possible to effectively suppress the electromagnetic coupling between the switches 33 and 34.

The first conductive component that is disposed in the region P and that suppresses the above-described electromagnetic coupling may be the PA control circuit 70. Accordingly, the electromagnetic coupling between the switches 33 and 34 can be suppressed.

In the RF module 1A according to the present example, the power amplifier 11 is disposed on the principal surface 91a, and the low-noise amplifier 21 is disposed on the principal surface 91b. With this disposition, the power amplifier 11 that amplifies a transmission signal and the low-noise amplifier 21 that amplifies a reception signal are disposed separately on different surfaces, and thus isolation between transmission and reception can be enhanced.

It is desired that the module substrate 91 have a multilayer structure including a plurality of laminated dielectric layers and that at least one of the plurality of dielectric layers have a ground electrode pattern. This configuration improves the electromagnetic field blockage function of the module substrate 91.

The power amplifier 11 is a component that generates a large amount of heat among the circuit components included in the RF module 1A. To enhance the heat dissipation performance of the RF module 1A, it is important to dissipate heat generated by the power amplifier 11 to the external substrate via a heat dissipation path having a small thermal resistance. If the power amplifier 11 is mounted on the principal surface 91b, an electrode wiring line connected to the power amplifier 11 is disposed on the principal surface 91b. In this case, the heat dissipation path includes a heat dissipation path that passes through only a plane wiring pattern on the principal surface 91b (along the xy plane direction). The plane wiring pattern is formed of a metal thin film and thus has a large thermal resistance. Thus, if the power amplifier 11 is disposed on the principal surface 91b, the heat dissipation performance decreases.

In contrast, in a case where the power amplifier 11 is disposed on the principal surface 91a, the power amplifier 11 can be connected to the external connection terminals 150 via a through electrode extending between the principal surfaces 91a and 91b. Thus, it is possible to exclude, as the heat dissipation path for the power amplifier 11, a heat dissipation path that passes through only a plane wiring pattern along the xy plane direction having a large thermal resistance among the wiring lines in the module substrate 91. Thus, it is possible to provide the RF module 1A that is compact and that has enhanced performance of heat dissipation from the power amplifier 11 to the external substrate.

Although not illustrated, in the RF module 1A according to the present example, the ground terminals 150g may be disposed in a region that is on the principal surface 91b and that is between the switches 34 and 35 in plan view of the module substrate 91.

According to the above-described configuration, on the principal surface 91b, the switches 34 and 35 are disposed so as to sandwich the ground terminals 150g. The ground terminals 150g are thus capable of blocking electromagnetic fields generated by the switches 34 and 35, and are thus capable of suppressing the electromagnetic coupling between the switches 34 and 35. This makes it possible to suppress the occurrence of a situation in which a high-power transmission signal flows into the RFIC 3 through the electromagnetic coupling, for example, without passing through the reception filter 61R and the low-noise amplifier 21 disposed on the reception path AR, or without passing through the reception filter 62R and the low-noise amplifier 21 disposed on the reception path BR.

As illustrated in part (b) of FIG. 2A, the diplexer 60 may be disposed in a region that is on the principal surface 91b and that is between the switches 34 and 35 in plan view of the module substrate 91. The diplexer 60 is an example of a second conductive component and includes conductive members, such as an electrode and a terminal. The diplexer 60 is thus capable of blocking electromagnetic fields generated by the switches 34 and 35 and is thus capable of suppressing the electromagnetic coupling between the switches 34 and 35.

The second conductive component disposed in the region between the switches 34 and 35 is not limited to the diplexer 60, and may be at least one of the switches 31, 32, and 33, the PA control circuit 70, the transmission filters 61T and 62T, and the reception filters 61R and 62R.

In the RF module 1A according to the present example, as illustrated in part (b) of FIG. 2A, the ground terminals 150g may be disposed in the region P that is on the principal surface 91b and that is between the switches 33 and 35 in plan view of the module substrate 91.

According to the above-described configuration, on the principal surface 91b, the switches 33 and 35 are disposed so as to sandwich the ground terminals 150g. The ground terminals 150g are thus capable of blocking electromagnetic fields generated by the switches 33 and 35, and are thus capable of suppressing the electromagnetic coupling between the switches 33 and 35. This makes it possible to suppress the occurrence of a situation in which a high-power transmission signal, a harmonic, or intermodulation distortion between the transmission signal and another RF signal flows into either the reception path AR or BR through the electromagnetic coupling, for example, without passing through the switch 31 and the transmission filter 61T disposed on the transmission path AT, causing degradation of the reception sensitivity of the reception path.

As illustrated in part (b) of FIG. 2A, in plan view of the module substrate 91, at least one of the switches 31 and 32 and the PA control circuit 70 (third conductive component) may be disposed in the region P that is on the principal surface 91b and that is between the switches 33 and 35. Although not illustrated, at least one of the transmission filters 61T and 62T and the reception filters 61R and 62R may be disposed on the principal surface 91b, and the at least one filter may be disposed in the region P that is on the principal surface 91b and that is between the switches 33 and 35 in plan view of the module substrate 91. This disposition makes it possible to suppress degradation of the reception sensitivity of the reception path.

In the RF module 1A according to the present example, on the principal surface 91b that faces the external substrate among the principal surfaces 91a and 91b, the power amplifier 11, which is difficult to be reduced in profile, is not disposed, but the low-noise amplifier 21, the PA control circuit 70, the switches 31 to 35, and the diplexer 60, which can be easily reduced in profile, are disposed. Thus, the profile of the entire RF module 1A can be reduced.

As illustrated in part (b) of FIG. 2A, the low-noise amplifier 21 and the switch 34 may be included in a semiconductor IC 80. This makes it possible to promote the reduction in the size of the RF module 1A. The semiconductor IC 80 may further include at least one of the switches 31, 32, 33, and 35.

In the RF module 1 according to the present embodiment, at least one of the power amplifier 11, the duplexers 61 and 62, and the matching circuits 51 to 54 may be disposed on the principal surface 91b, and at least one of the PA control circuit 70, the low-noise amplifier 21, the switches 31, 32, and 35, and the diplexer 60 may be disposed on the principal surface 91a.

Each of the external connection terminals 150 (and the ground terminals 150g) may be a column-shaped electrode extending through the resin member 93 in the z-axis direction as illustrated in FIG. 2A and FIG. 2B.

Figure 2C:
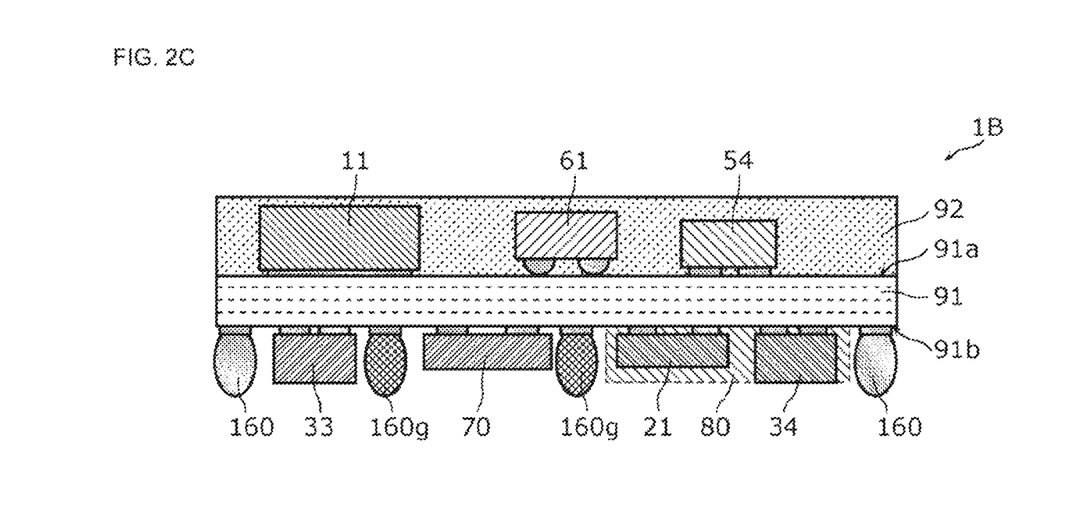
FIG. 2C is a schematic sectional view of the configuration of a radio-frequency module according to a modification example.

Alternatively, as in an RF module 1B according to a modification example illustrated in FIG. 2C, the external connection terminals 150 (and the ground terminals 150g) may be bump electrodes 160 (and ground terminals 160g) disposed on the principal surface 91b. In this case, the resin member 93 on the principal surface 91b is not necessarily provided.

In the RF module 1 according to the present embodiment, the external connection terminals 150 may be disposed on the principal surface 91a.

3. Advantages and the Like

As described above, the RF module 1 according to the present embodiment includes the module substrate 91 having the principal surfaces 91a and 91b that face each other, the power amplifier 11 capable of amplifying a transmission signal, the low-noise amplifier 21 capable of amplifying a reception signal, the switch 33 connected to the input terminal of the power amplifier 11 and disposed on the principal surface 91b, the switch 34 connected to the output terminal of the low-noise amplifier 21 and disposed on the principal surface 91b, and the ground terminals 150g disposed in a region that is on the principal surface 91b and that is between the switch 33 and the switch 34 in plan view of the module substrate 91.

With this configuration, the ground terminals 150g are capable of blocking electromagnetic fields generated by the switches 33 and 34, and thus the electromagnetic coupling between the switches 33 and 34 can be suppressed. This makes it possible to suppress the occurrence of a situation in which a harmonic of a high-power transmission signal transmitted through the transmission paths AT and BT or intermodulation distortion between the transmission signal and another RF signal flows into either the reception path AR or BR through the electromagnetic coupling, causing degradation of the reception sensitivity of the reception path.

In the RF module 1, the ground terminals 150g may be disposed between the switches 33 and 34.

With this disposition, the electromagnetic coupling between the switches 33 sand 34 can be effectively suppressed.

The RF module 1 according to the present embodiment includes the module substrate 91 having the principal surfaces 91a and 91b that face each other, the power amplifier 11 capable of amplifying a transmission signal, the low-noise amplifier 21 capable of amplifying a reception signal, the switch 33 connected to the input terminal of the power amplifier 11 and disposed on the principal surface 91b, the switch 34 connected to the output terminal of the low-noise amplifier 21 and disposed on the principal surface 91b, and the first conductive component disposed in a region that is on the principal surface 91b and that is between the switches 33 and 34 in plan view of the module substrate 91.

With this configuration, the first conductive component is capable of blocking electromagnetic fields generated by the switches 33 and 34, and thus the electromagnetic coupling between the switches 33 and 34 can be suppressed. This makes it possible to suppress the occurrence of a situation in which a harmonic of a high-power transmission signal transmitted through the transmission paths AT and BT or intermodulation distortion between the transmission signal and another RF signal flows into either the reception path AR or BR through the electromagnetic coupling, causing degradation of the reception sensitivity of the reception path.

In the RF module 1, the first conductive component may be disposed between the switches 33 and 34.

With this disposition, the electromagnetic coupling between the switches 33 sand 34 can be effectively suppressed.

In the RF module 1, the first conductive component may be the switch 31 connected to the output terminal of the power amplifier 11.

With this configuration, the switch 31 is capable of blocking electromagnetic fields generated by the switches 33 and 34, and thus the electromagnetic coupling between the switches 33 and 34 can be suppressed.

In the RF module 1, the first conductive component may be the PA control circuit 70 configured to control the power amplifier 11.

With this configuration, the PA control circuit 70 is capable of blocking electromagnetic fields generated by the switches 33 and 34, and thus the electromagnetic coupling between the switches 33 and 34 can be suppressed.

The RF module 1 may further include the plurality of external connection terminals 150 disposed on the principal surface 91b.

In the RF module 1, the power amplifier 11 may be disposed on the principal surface 91a, and the low-noise amplifier 21 may be disposed on the principal surface 91b.

With this disposition, the power amplifier 11 that amplifies a transmission signal and the low-noise amplifier 21 that amplifies a reception signal are disposed separately on different surfaces, and thus isolation between transmission and reception can be enhanced.

The RF module 1 may further include the antenna connection terminal 100, the switch 35 connected to the antenna connection terminal 100, and the ground terminals 150g disposed in a region that is on the principal surface 91b and that is between the switches 34 and 35 in plan view of the module substrate 91.

With this configuration, the ground terminals 150g are capable of blocking electromagnetic fields generated by the switches 34 and 35, and thus the electromagnetic coupling between the switches 34 and 35 can be suppressed. This makes it possible to suppress the occurrence of a situation in which a high-power transmission signal flows into the RFIC 3 through the electromagnetic coupling, for example, without passing through the reception filter 61R and the low-noise amplifier 21 disposed on the reception path AR, or without passing through the reception filter 62R and the low-noise amplifier 21 disposed on the reception path BR.

The RF module 1 may further include the second conductive component disposed in a region that is on the principal surface 91b and that is between the switches 34 and 35 in plan view of the module substrate 91.

With this configuration, the second conductive component is capable of blocking electromagnetic fields generated by the switches 34 and 35, and thus the electromagnetic coupling between the switches 34 and 35 can be suppressed.

In the RF module 1, the second conductive component may be the diplexer 60 connected to the switch 35.

The communication device 5 includes the antenna 2, the RFIC 3 configured to process an RF signal that is to be transmitted by the antenna 2 or that has been received by the antenna 2, and the RF module 1 configured to transmit the RF signal between the antenna 2 and the RFIC 3.

With this configuration, it is possible to provide the communication device 5 in which degradation of isolation between transmission and reception is suppressed.

Other Embodiments

The RF module and the communication device according to the embodiment of the present disclosure have been described above by using an embodiment, an example, and a modification example. An RF module and a communication device according to an embodiment of the present disclosure are not limited to the above-described embodiment, example, and modification example. Another embodiment implemented by combining certain elements in the above-described embodiment, example, and modification example; a modification example obtained by applying, to the above-described embodiment, example, and modification example, various modifications conceived of by a person skilled in the art without deviating from the gist of the present disclosure; and various apparatuses including the above-described RF module and communication device, are also included in the present disclosure.

For example, in the RF module and the communication device according to the above-described embodiment, example, and modification example, another circuit element, wiring line, and so forth may be disposed on a path that connects each circuit element and a signal path disclosed in the drawings.

An embodiment of the present disclosure can be widely used, in communication devices such as mobile phones, as an RF module disposed in a multiband-compatible front-end portion.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio-frequency module comprising:
    a module substrate having a first principal surface and a second principal surface opposite to the first principal surface;
    a power amplifier configured to amplify a transmission signal;
    a low-noise amplifier configured to amplify a reception signal;
    a first switch connected to an input terminal of the power amplifier and disposed on the second principal surface;
    a second switch connected to an output terminal of the low-noise amplifier and disposed on the second principal surface; and a first ground terminal disposed in a region of the second principal surface between the first switch and the second switch in plan view of the module substrate.

2. The radio-frequency of claim 1, wherein
the first ground terminal is disposed between the first switch and the second switch.

3. The radio frequency module of claim 1, wherein
the power amplifier is disposed on the first principal surface.

4. The radio frequency module of claim 3, wherein
the low-noise amplifier is disposed on the second principal surface.

5. The radio-frequency module of claim 1, further comprising:
an antenna connection terminal; and
a third switch connected to the antenna connection terminal, the power amplifier and the low-noise amplifier.

6. The radio frequency module of claim 5, further comprising:
a second ground terminal disposed in a region of the second principal surface between the second switch and the third switch in plan view of the module substrate.

7. The radio-frequency module of claim 5, further comprising:
a conductive component disposed in a region of the second principal surface between the second switch and the third switch in plan view of the module substrate.

8. The radio frequency module of claim 7, wherein
the conductive component is a filter connected to the third switch.

9. A radio-frequency module comprising:
a module substrate having a first principal surface and a second principal surface opposite to the first principal surface;
a power amplifier configured to amplify a transmission signal;
a low-noise amplifier configured to amplify a reception signal;
a first switch connected to an input terminal of the power amplifier and disposed on the second principal surface;
a second switch connected to an output terminal of the low-noise amplifier and disposed on the second principal surface; and
a first conductive component disposed in a region of the second principal surface between the first switch and the second switch in plan view of the module substrate.

10. The radio-frequency module of claim 9, wherein
the first conductive component is disposed between the first switch and the second switch.

11. The radio-frequency module of claim 9, wherein
the first conductive component is a third switch connected to an output terminal of the power amplifier.

12. The radio-frequency module of claim 9, wherein
the first conductive component is a control circuit configured to control the power amplifier.

13. The radio-frequency module of claim 9, further comprising:
a plurality of external connection terminals disposed on the second principal surface.

14. The radio frequency module of claim 9, wherein
the power amplifier is disposed on the first principal surface.

15. The radio frequency module of claim 14, wherein
the low-noise amplifier is disposed on the second principal surface.

16. The radio-frequency module of claim 9, further comprising:
an antenna connection terminal; and
a third switch connected to the antenna connection terminal, the power amplifier and the low-noise amplifier.

17. The radio frequency module of claim 16, further comprising:
a ground terminal disposed in a region of the second principal surface between the second switch and the third switch in plan view of the module substrate.

18. The radio-frequency module of claim 16, further comprising:
a second conductive component disposed in a region of the second principal surface between the second switch and the third switch in plan view of the module substrate.

19. The radio-frequency module of claim 18, wherein
the second conductive component is a filter connected to the third switch.

20. A communication device comprising:
an antenna;
a radio-frequency signal processing circuit configured to process a radio-frequency signal that is to be transmitted by the antenna or that has been received by the antenna; and
a radio-frequency module configured to transmit the radio-frequency signal between the antenna and the radio-frequency signal processing circuit, wherein
the radio frequency module includes
a module substrate having a first principal surface and a second principal surface opposite to the first principal surface;
a power amplifier configured to amplify a transmission signal;
a low-noise amplifier configured to amplify a reception signal;
a first switch connected to an input terminal of the power amplifier and disposed on the second principal surface;
a second switch connected to an output terminal of the low-noise amplifier and disposed on the second principal surface; and
a conductive component disposed in a region of the second principal surface between the first switch and the second switch in plan view of the module substrate.

* * * * *